J. H. SEAMAN.
GASALIER.
No. 10,070. Reissued Apr. 4, 1882.
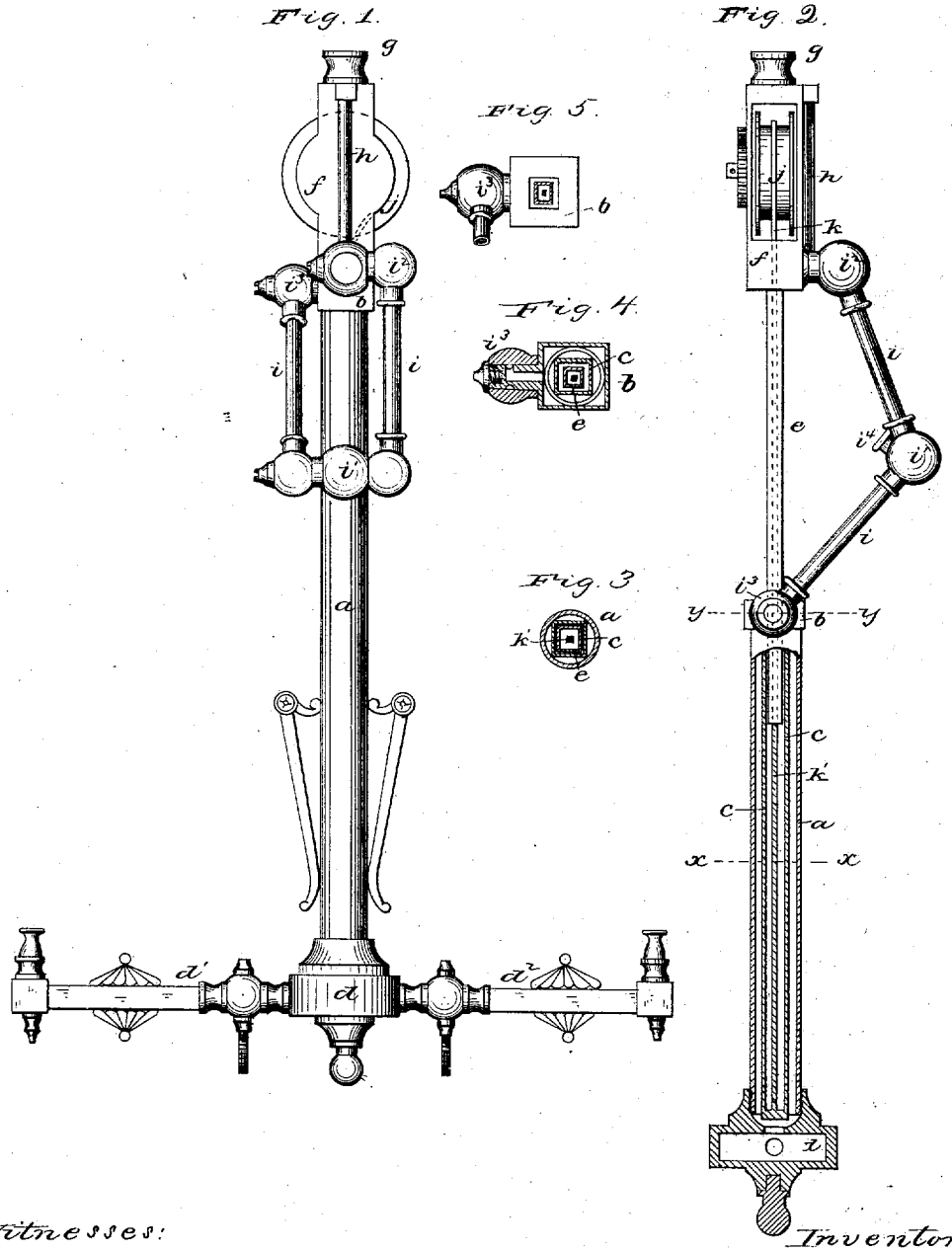
Witnesses:
N. N. Low
J. S. Barker
Inventor:
John H. Seaman
by Doubleday & Bliss
attys.
N. PETERS, Photo-Lithographer, Washington, D. C.

UNITED STATES PATENT OFFICE.

JOHN H. SEAMAN, OF BROOKLYN, NEW YORK.

GASALIER.

SPECIFICATION forming part of Reissued Letters Patent No. 10,070, dated April 4, 1882.

Original No. 116,358, dated June 27, 1871. Application for reissue filed February 18, 1882.

*To all whom it may concern:*

Be it known that I, JOHN H. SEAMAN, a citizen of the United States, of Brooklyn, E. D., in the county of Kings and State of New York, have invented certain new and useful Improvements in Gasaliers; and I do hereby declare that the following is a full, clear, and exact description of the invention that will enable others skilled in the art to which it appertains to make and use the same, reference being had to the accompanying drawings, and to letters of reference marked thereon, which form a part of this specification.

My said invention relates to gasaliers or chandeliers for burning gas that are suspended from a gas-pipe in the ceiling and are adjustable at different heights by means of a sliding stem.

The sliding stems of gas-fixtures heretofore used have required packing or a water-sealed joint, because the gasway is through the fixed pipe upon which the stem slides up and down; but whether packing or a water-joint is used in such fixtures, they are undesirable, because of the disagreeable smell from the exposed surface of the fixed pipe when the gasalier is lowered, and also because of the escaping gas from such necessarily imperfect means of confinement. In my improved gasalier I cut off the gas entirely from the sliding joint within the stem by a sheath or guide suspended within the stem and use the vertical fixed pipe merely as a guide for the sliding of the stem, and obtain an extensible gasway by a folding-pipe, which connects the sliding stem with the fixed upper part of the fixture attached to the supply-pipe projecting from the ceiling.

The first part of my invention consists in combining with the sliding stem an inner guide or sheath cut off from the gas within the stem, a fixed guide projecting downward from the fixed part of the gasalier and received in the inner guide or sheath within the stem, the fixed guide and its corresponding guide or sheath within the stem forming no part of the gasway of the stem, the gasway of the stem being the annulus or space or spaces between the internal guide and the stem, and not connected with the interior of the fixed guide, so that the stem slides loosely and freely up and down upon the fixed guide, said combination being substantially as hereinafter described; and my invention further consists in combining with a stem and guide constructed as above described a folding gas-pipe having a central folding joint, said pipe being connected with the stem and with the gasway of the fixed upper part of the gasalier attached to the supply-pipe, the whole substantially as hereinafter described.

My invention also consists in combining and arranging with the sliding stem and hollow fixed guide a cord and spring-barrel to counterbalance the weight of the movable part of the pendant or chandelier, substantially as herein described.

Figure 1 of the drawings represents a front elevation of a pendant or two-light gasalier constructed with my improvements; Fig. 2, a side elevation of the same partly in section; Fig. 3, a transverse section through dotted lines *x x*, Fig. 2. Fig. 4 is a transverse section through dotted lines *y y*, Fig. 2. Fig. 5 is a top view of the stem-cup, showing a section of hollow guide and cord.

*a* represents the stem; *b*, a cap on top of the stem with a square hole in the middle which embraces the top of the internal guide or sheath, *c*, which is a pipe suspended within the stem and open at the top to receive the guide and hermetically sealed at the bottom to prevent the escape of gas upward through it. The lower part of the stem is open and connected by a screw-joint to the cast center *d*, which is chambered, as usual, to continue the gasway to the branches $d'$ $d^2$, which carry gas-burners.

The internal guide or sheath is made of square pipe, as shown in the drawings, to correspond with the fixed guide *e*, which is also four-sided; but both may be made of round pipe, if desired. In either case the gasway of the stem is the annulus or space or spaces between the internal guide or sheath and the stem.

The interior of the internal guide or sheath is entirely cut off from the gasway of the stem by the closed lower end and by the cap that holds its upper end and covers the gasway of the stem. *f* represents the fixed part of the pendant to be attached by the stiff screw-joint *g* to a supply-pipe projecting downward from the ceiling. The gasway of this fixed part is through the stiff joint *g*, a chamber in the upper part of the fixed part and a small pipe, $h$. The folding gas-pipe $i$ has a central folding-joint, $i'$, and connects it with the pipe $h$ by a turning-joint, $i^2$, and with the stem by another turning-joint, $i^3$, which connects with the cap of the stem, as shown in the drawings, the cap being chambered as shown to connect the gasway with the stem. The folding pipe $i$ has a folding joint near the middle of its length, making one of the members of the folding pipe sufficiently shorter than the other to admit of the folding of the pipe close to the stem of the burner. There should also be a stop, $i^4$, projecting from the folding joint $i'$ toward the stem, which will come in contact with the stem when the folding pipe is folded to prevent the joints from being brought into line so as to impede the downward movement of the sliding parts. A spring-barrel, $j$, placed in the fixed part $f$ of the pendant, counterbalances the weight of the sliding parts, being connected thereto by a cord or chain, $k$, which passes down through the fixed guide, made hollow for that purpose, and may be secured at the bottom of the internal guide, $c$; but I prefer to make part of the connection of wire, the wire forming the lower part, $k'$, being secured to the bottom of the internal guide and connected to the cord or chain by a hook and loop (not shown in the drawings) at a point a little above the top of the stem, which may be done by putting the cord down below the vertical guide before making the connection.

It will readily be understood that in a chandelier having one of its tubes polygonal in cross-section with a corresponding polygonal-shaped portion sliding thereon, such parts are adapted to prevent rotation of one tube-section relative to the other.

It will also be understood that the cord which slides within the tube-sections is thereby concealed from view, and that the adjacent polygonal-shaped portions are adapted to prevent twisting of the cord, from the fact that that part of the chandelier which supports the burners cannot be rotated relative to the stationary upper portion.

I do not claim as my invention the invention secured in the patent to Charles Deans of July 19, 1870.

I claim—

1. In a chandelier, the combination of an upper stationary tube, a lower sliding burner-support, means adapted to prevent the rotation of the burner-support relative to the stationary tube-section, a spring-barrel, and a cord connected with the spring-barrel and with the sliding burner-support, substantially as set forth.

2. In a chandelier, the combination of an upper stationary tube, a lower sliding burner-support, means adapted to prevent the rotation of the burner-support relative to the stationary tube-section, a spring-barrel, and a cord passing through the upper stationary tube and connected with the spring-barrel and the lower sliding burner-support, substantially as set forth.

3. The combination, in a chandelier, with a sliding burner-support and a hollow fixed guide, which are arranged to always overlap each other, of the spring-barrel and cord connection, substantially as set forth.

4. In combination with a fixed guide projecting downward from the fixed part of the gasalier, a sliding stem to which the branches are connected, and which has within it an internal sheath or guide cut off from the gasway of the stem and open at the top to receive the fixed guide, substantially as hereinbefore described.

5. In combination with the fixed guide and the sliding stem with its internal guide, the folding gas-pipe, which connects the gasway of the stem with that of the fixed part connected with the source of supply, substantially as described.

6. The combination, with the sliding pipe and the guide therefor, of the folding pipe-connection having a single middle joint and pivoted to the sliding part and the fixed part substantially as set forth, to have the axis of its pivotal connection with the sliding part in a vertical plane other than that of the axis of its pivotal connection with the fixed part, whereby the pipe-connection can be folded close to the stem.

In testimony whereof I affix my signature in presence of two witnesses.

JOHN H. SEAMAN. [L. S.]

Witnesses:
J. VAN SANTVOORD,
E. F. KASTENHUBER.